Figure 1:
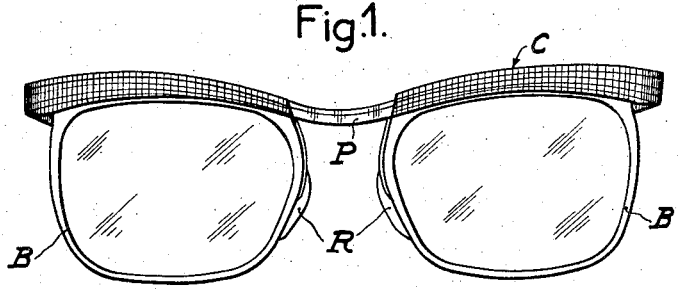

3,025,761
SPECTACLE MOUNTINGS
Jacques Beasse, Paris, France, assignor to Societe Industrielle et Commerciale des Ouvriers Lunetiers (Cottet, Poichet, Tagnon & Cie), Paris, France
Filed June 25, 1959, Ser. No. 822,960
Claims priority, application France June 27, 1958
1 Claim. (Cl. 88—47)

Plastic rimmed spectacles having a metal front bar are already known. Various arrangements have been proposed in which this bar is disposed either on the front face of the rims, or on their rear face, or fitted therein; in this last instance, the milled portion provided to this end tends to become soiled and requires the use of opaque materials for making the rims.

According to this invention, the eyebrow portion of the spectacle frame is accentuated by providing an arrangement whereby the front bar already positioned in the rim grooves is capped with an ornamental channel member.

Figure 2:
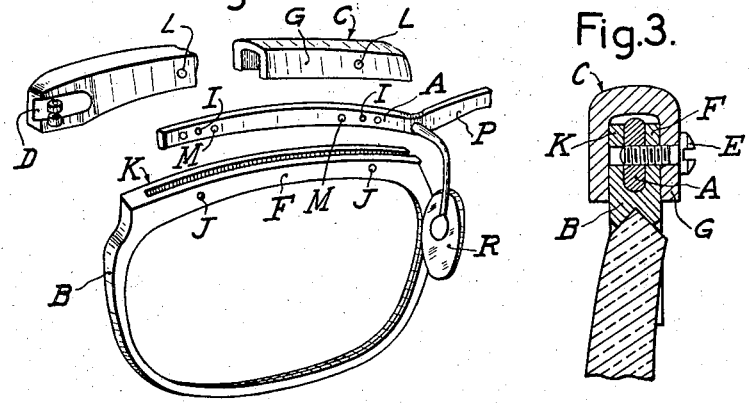
Figure 3:
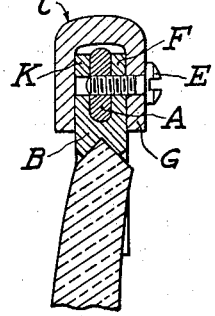
Figures 4, 5:
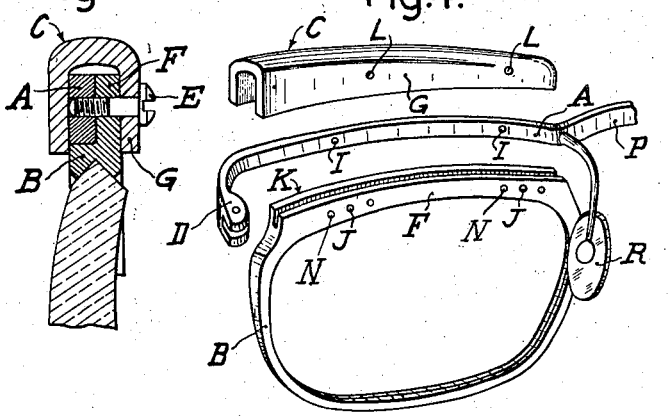

In order to afford a clearer understanding of the features of this invention the latter will now be described hereafter with reference to the attached drawing forming part of this specification and illustrating diagrammatically, by way of example, two typical forms of embodiment. In the drawing:

FIGURE 1 is a front view of a spectacle mounting;
FIGURE 2 is an exploded view showing the different component elements of the spectacle mounting as seen from the rear;
FIGURE 3 is a section taken across a fixation screw;
FIGURES 4 and 5 are respectively an exploded view from the rear, and a cross-section of a modified embodiment.

The metal front bar or support A of which the intermediate portion between oppositely disposed end portions constitutes the bridge piece P, is fitted in the grooved or milled upper edge of the rims B preferably of plastic material. This assembly is capped by an ornamental piece C having the form of an inverted U or channel in cross section, the temple hinges D for attaching temple bars being secured at the outer ends of this piece as shown in FIG. 2.

Holes J formed in the rear face F of each rim B, and L in the rear face G of the ornamental piece C, register to permit the insertion of screws E engaging tapped holes I formed in the front bar A.

If the ornamental piece C is made of opaque material, the mounting will be properly concealed and provide an extremely rigid spectacle frame (FIG. 1) of very sober design, in which no bar, grooves or screws are visible.

This mounting is particularly advantageous since the ornamental pieces C made, for example of different colors can be changed at will, along with their respectively corresponding temple bars.

In the modified form of embodiment illustrated in FIGS. 4 and 5, the temple hinges D may be formed or secured on the front bar A (FIG. 4), this arrangement being particularly suitable in the case of metal temple bars.

Similarly, each rim B may be so shaped as to afford a certain degree of lateral displacement of this rim with a view to permit the adjustment of the pupillary spacing. In this case, a plurality of holes J, M will be formed through the rear wall F of said rim, or a plurality of taped holes I, N will be formed in the bar A.

Again, the nose plates R shown herein as adjustable may be glued or welded directly on the rims B; in this case the relative positions of the rims will correspond to different nose gaps of the spectacles.

On the other hand, the thickness of the front wall K of rim B may be reduced or this front wall may be dispensed with (FIG. 5). In this case the rim and the front bar are juxtaposed and capped together by the ornamental piece C.

What I claim is:

Spectacle mounting comprising: a metal front bar having a center bridge portion longitudinally separating oppositely disposed end portions; a pair of annular rims for respectively mounting the spectacle lenses therein; said rims having an upper edge respectively grooved longitudinally to receive said end portions of the front bar; a pair of longitudinally channeled structural support and ornamental members, each having oppositely disposed inner and outer ends, adapted to respectively fit over said upper edges of said rims, said structural support and ornamental members respectively extending longitudinally with said inner ends at said center bridge portion and said outer ends reaching just beyond said rims to provide a supporting structure and ornamentation, temple bars respectively hingedly attached to and supported by the outer ends of the structural support and ornamental members; fastening means for engaging and securing said structural support and ornamental members and hinged temple bars to said rims, and said front bar end portions in said grooves of said rims, the respective upper edges of said structural support and ornamental members concealing said fastening means from observation when the spectacles are in use, and said structural support and ornamental members and hinged temple bars being replaceable as matched units with other matched units of different color, the lenses remaining securely mounted in the annular rims and the front bar end portions mounted in the grooved upper edges of said rims while said structural support and ornamental members and hingedly attached temple bars are replaced.

References Cited in the file of this patent
UNITED STATES PATENTS

| 2,155,693 | Tanasso et al. | Apr. 25, 1939 |
| 2,653,513 | Martin | Sept. 29, 1953 |
| 2,688,273 | Markell | Sept. 7, 1954 |
| 2,922,238 | Neary | Jan. 26, 1960 |

FOREIGN PATENTS

| 68,374 | France | Sept. 7, 1954 |